(No Model.)  3 Sheets—Sheet 1.
J. A. HOWARTH.
CHUCK.
No. 597,558.  Patented Jan. 18, 1898.
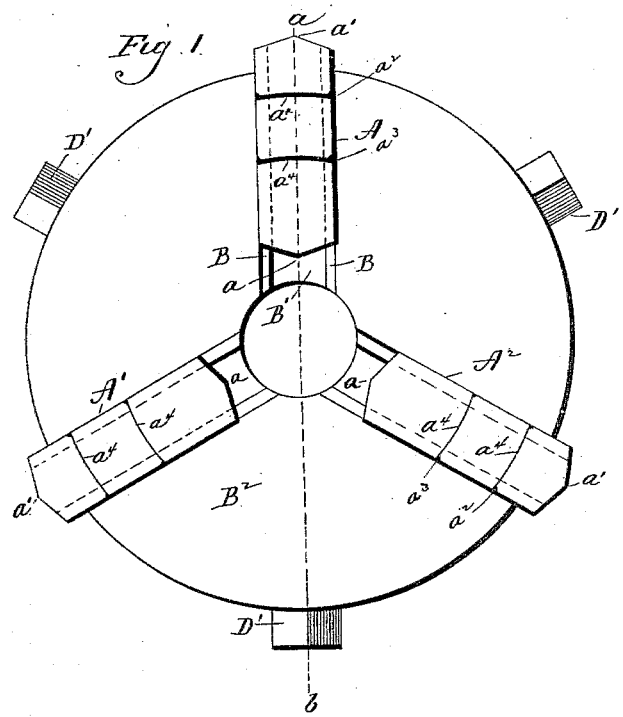
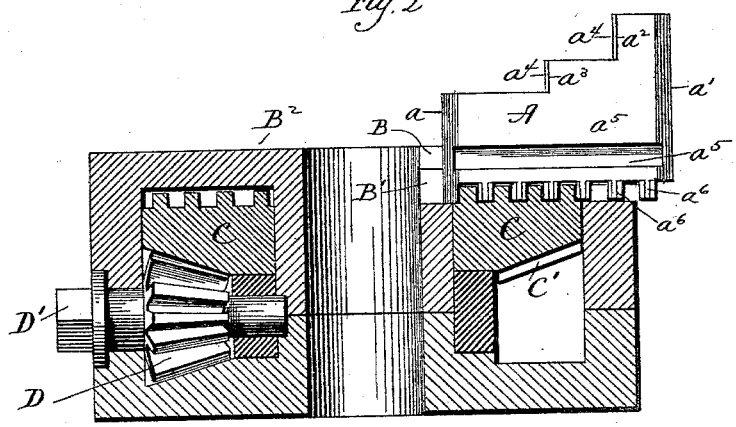

(No Model.)  3 Sheets—Sheet 2.
J. A. HOWARTH.
CHUCK.
No. 597,558. Patented Jan. 18, 1898.
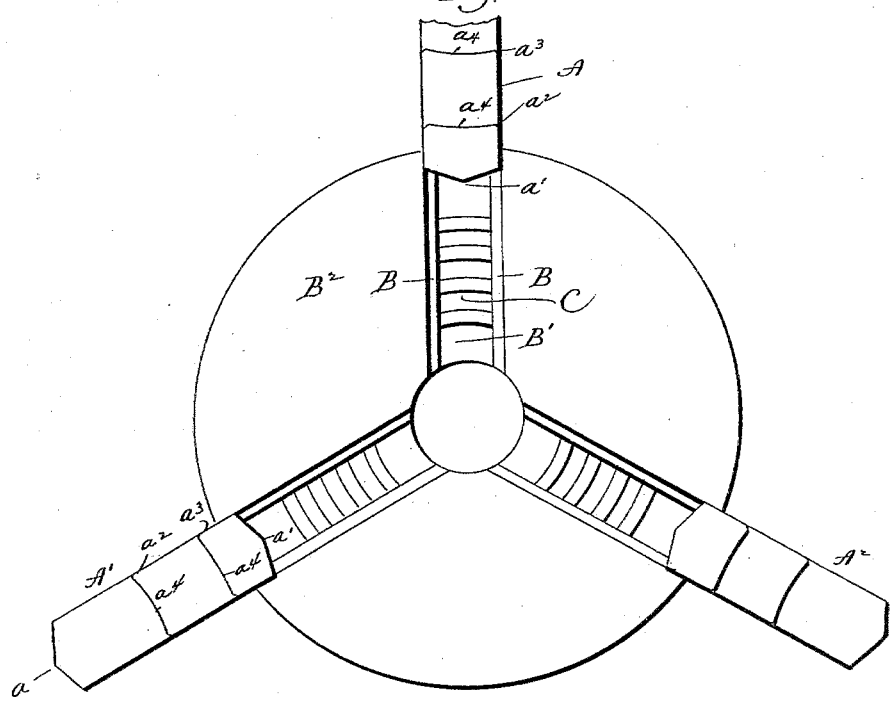
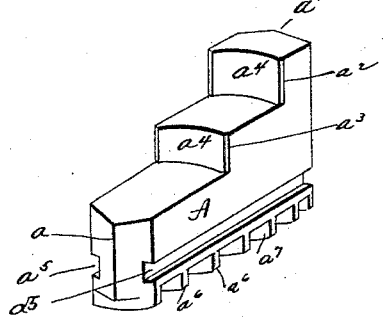

(No Model.)  3 Sheets—Sheet 3.
J. A. HOWARTH.
CHUCK.
No. 597,558.  Patented Jan. 18, 1898.
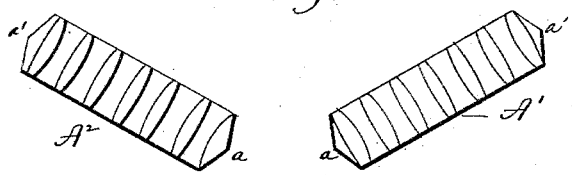
Fig. 5.
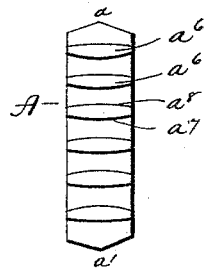
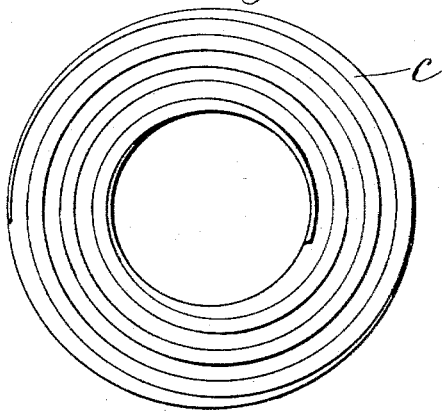
Fig. 6.

United States Patent Office.

JAMES A. HOWARTH, OF NEW HAVEN, CONNECTICUT, ASSIGNOR TO THE HOGGSON & PETTIS MANUFACTURING COMPANY, OF SAME PLACE.

CHUCK.

SPECIFICATION forming part of Letters Patent No. 597,558, dated January 18, 1898.

Application filed August 23, 1897. Serial No. 649,141. (No model.)

*To all whom it may concern:*

Be it known that I, JAMES A. HOWARTH, of New Haven, in the county of New Haven and State of Connecticut, have invented a new Improvement in Chucks; and I do hereby declare the following, when taken in connection with the accompanying drawings and the letters of reference marked thereon, to be a full, clear, and exact description of the same, and which said drawings constitute part of this specification, and represent, in—

Figure 1, a plan view of a scroll-chuck provided with solid reversible jaws constructed in accordance with my invention; Fig. 2, a view thereof in vertical section on the line $a\ b$ of Fig. 1; Fig. 3, a plan view of the chuck with the jaws reversed therein; Fig. 4, a perspective view of one of the jaws; Fig. 5, a reverse plan view of the three jaws arranged in the same manner as they are arranged in the chuck; Fig. 6, a detached plan view of the scroll.

My invention relates to an improvement in jaws for that class of chucks known as "scroll-chucks" on account of the fact that their jaws are operated by means of a revoluble scroll, the object being to produce a solid reversible jaw having a long and a short gripping-face.

With these ends in view my invention consists in a solid reversible jaw for scroll-chucks, the teeth of the jaw having their opposite edges oppositely beveled, so as to permit them to be reversed in their engagement with the revoluble scroll of a scroll-chuck.

In carrying out my invention, as herein shown, I employ three solid reversible jaws A, A', and $A^2$, each jaw being formed at its inner end, which is the end ordinarily used, with a short beveled gripping-face $a$ and at its outer end, which is less frequently used, with a long beveled gripping-face $a'$. The upper edge of each jaw is also cut away to form two holding-faces $a^2$ and $a^3$, each of which is formed with a slight concavity $a^4\ a^4$. Near its lower edge each jaw is formed with two corresponding parallel grooves $a^5\ a^5$, adapting the jaw to receive the guide-ribs B B, extending inwardly to guide the jaws from the opposite walls of the radial slots B' B', formed for the reception of the jaws in the body $B^2$ of the chuck. The lower edge of each jaw is formed with transversely-arranged teeth $a^6$, the opposite faces of which are oppositely beveled, as at $a^7\ a^8$, for the engagement of the jaws with the scroll C, by means of which they are operated and with either end of the jaws presented inward.

The scroll is operated in the usual manner by bevel-pinions D, arranged radially in the lower portion of the chuck-body, engaging with beveled teeth C', formed upon the bottom of the scroll and turned by means of square operating-stems projecting beyond the circumference of the said chuck-body. I do not, however, limit myself to constructing the chuck-body or any of its adjuncts in any particular way, my invention being satisfied in those regards by any chuck-body the scroll of which is adapted to coact with my improved solid reversible jaws, which are adapted to be reversed end for end and still coact with the scroll by oppositely beveling the opposite faces of their teeth. Reversible solid jaws are much superior to the sectional jaws heretofore employed, as they are easier and cheaper to make and more convenient to use, as well as more durable, as the sectional jaws are apt to get out of order or out of true when placed under great strain. It may be remarked also that one pair of solid reversible jaws perfectly takes the place of two pairs of solid non-reversible jaws and enables the user of the chuck to change from jaws of one kind to those of another with extreme facility, whereas when two independent pairs of jaws have to be interchanged in the chuck one pair is apt to get mislaid. It will be understood, of course, that in oppositely beveling the opposite faces of the teeth of the jaws regard is had to the manner in which the jaws engage in their reverse positions with the scroll. Thus, supposing the jaws A, A', and $A^2$ have their teeth cut for engagement with the outer convolution of the scroll in the order named when the jaws are used in the common way with their short inner faces $a$ innermost, then when the jaws are reversed in position so as to bring their long gripping-faces $a'$ innermost, the engagement of their teeth with the outer convolution of the scroll will be in the order represented by the letters $A^2$, $A'$, and $A$. It will be seen from this that the jaw $A'$ is intermediate in its cutting and retains its place in the chuck irrespective of its end for end position, while the jaws $A$ and $A^2$ exchange places with each other.

I am aware that sectional or composite reversible jaws are old, and do not claim reversible jaws broadly; but, Having fully described my invention, what I claim as new, and desire to secure by Letters Patent, is—

1. A solid reversible jaw for scroll-chucks, the said jaw having gripping-faces formed at its respective ends, and having the opposite faces of the transversely-arranged teeth upon its lower edge oppositely beveled.

2. A solid reversible jaw for scroll-chucks, the said jaw having a short inner gripping-face, a long outer gripping-face, intermediate holding-faces formed in its upper edge, and having its lower edge provided with teeth, the opposite faces of which are oppositely beveled to adapt the jaw to be reversed end for end in its engagement with the scroll of the chuck.

In testimony whereof I have signed this specification in the presence of two subscribing witnesses.

JAMES A. HOWARTH.

Witnesses:
HARRY B. KENNEDY,
ISAAC M. ULLMAN.